J. H. KEOWN.
SHOCKER ATTACHMENT FOR HARVESTER BINDERS.
APPLICATION FILED JAN. 30, 1920.
1,371,902.
Patented Mar. 15, 1921.
6 SHEETS—SHEET 1.
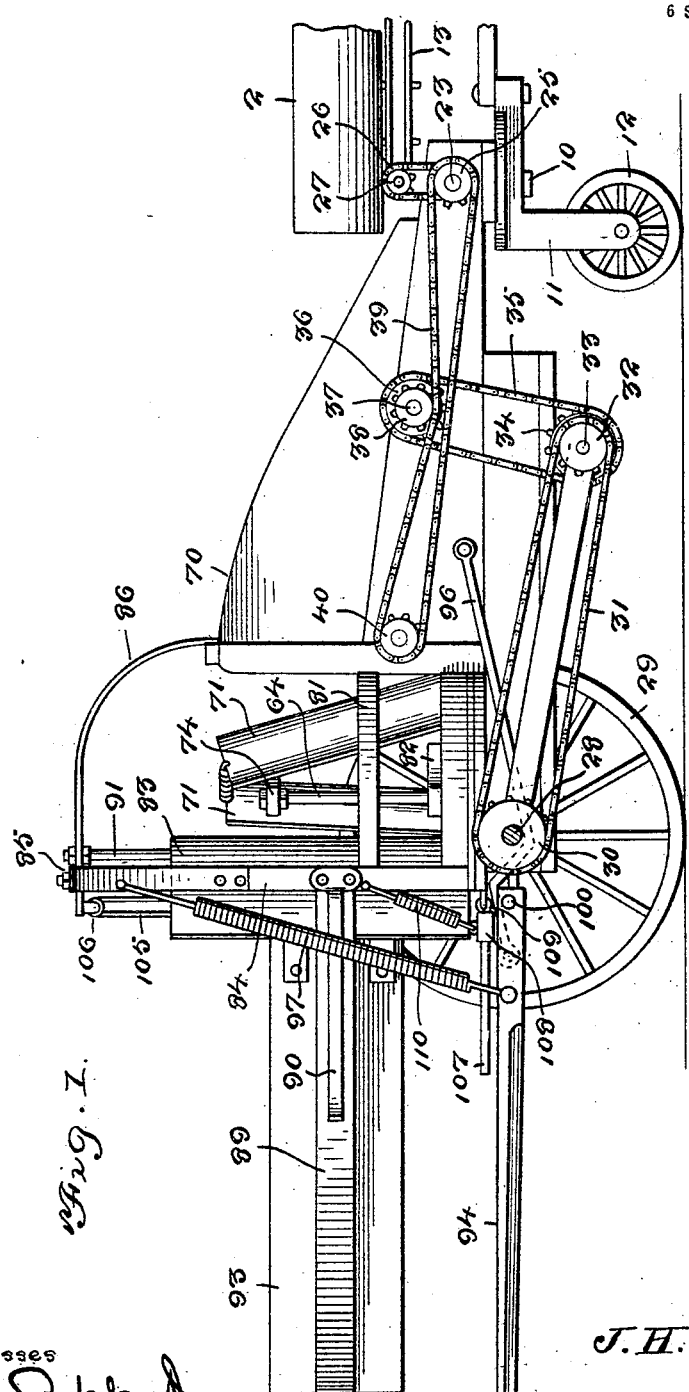
Inventor
J. H. Keown
Witnesses
By Victor J. Evans
Attorney

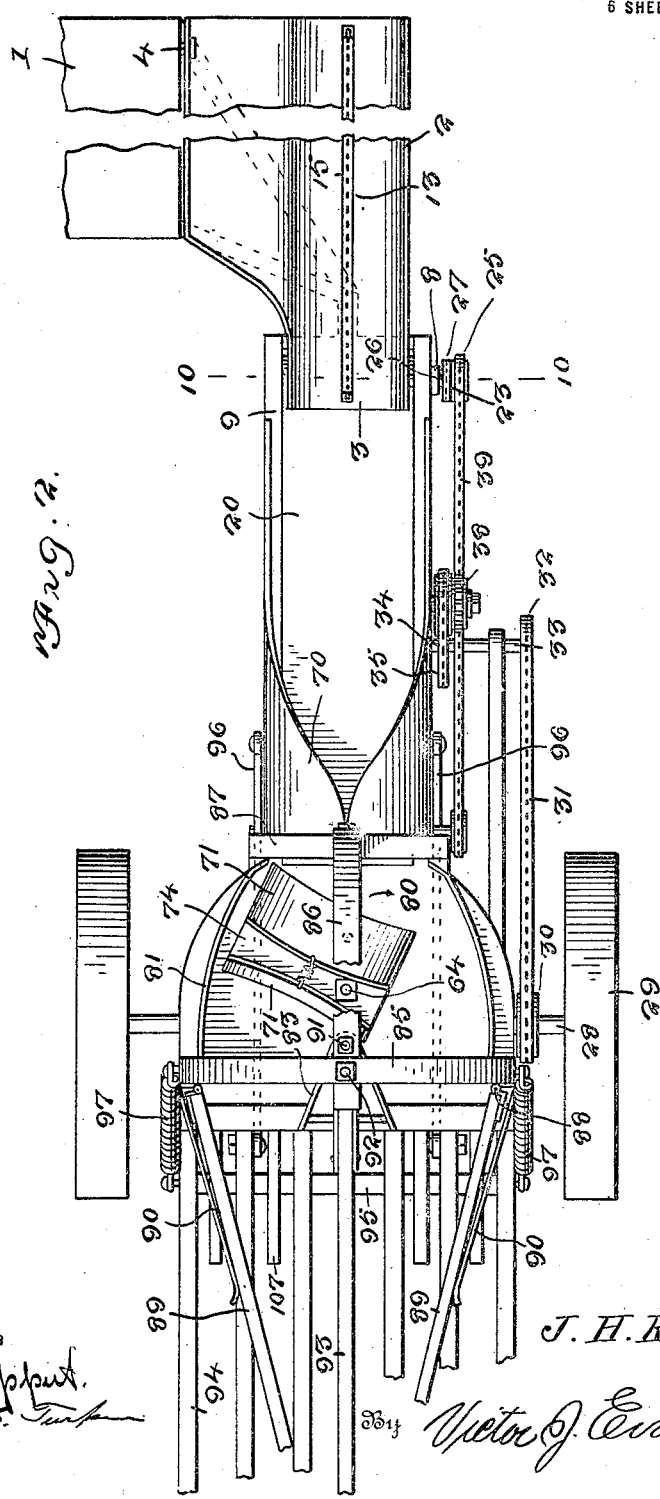

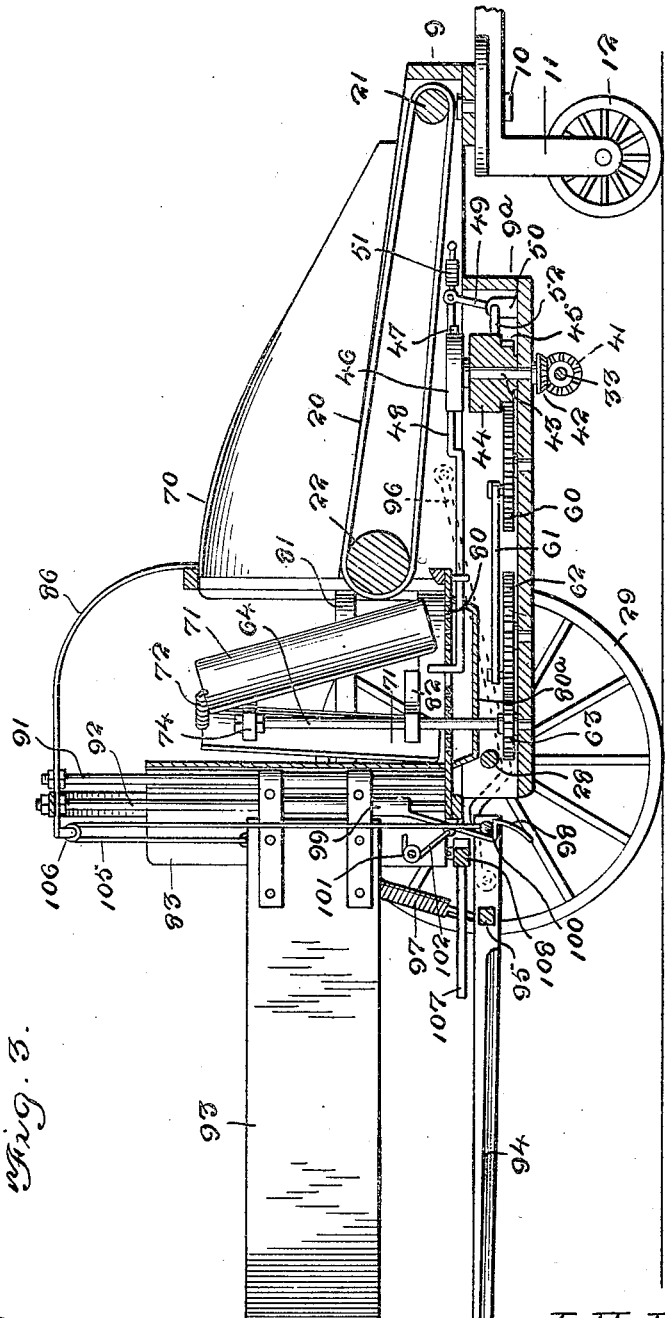

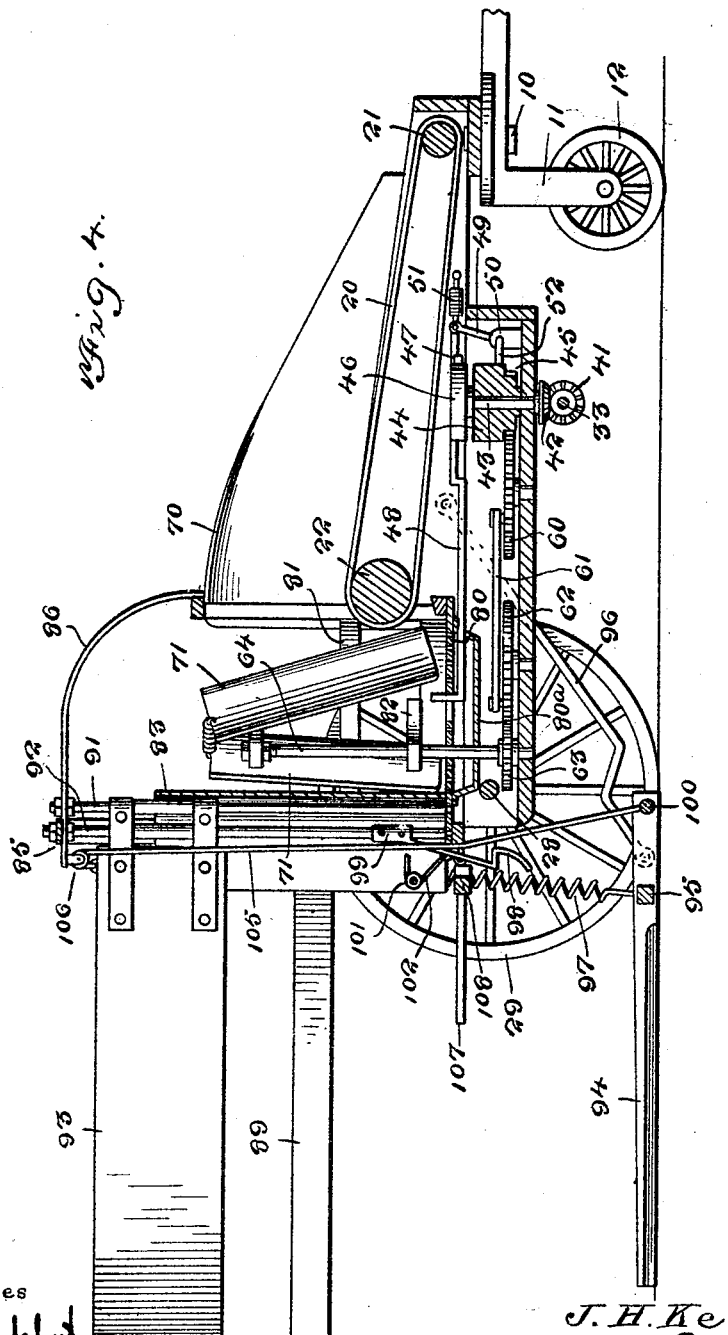

J. H. KEOWN.
SHOCKER ATTACHMENT FOR HARVESTER BINDERS.
APPLICATION FILED JAN. 30, 1920.
1,371,902.
Patented Mar. 15, 1921.
6 SHEETS—SHEET 5.
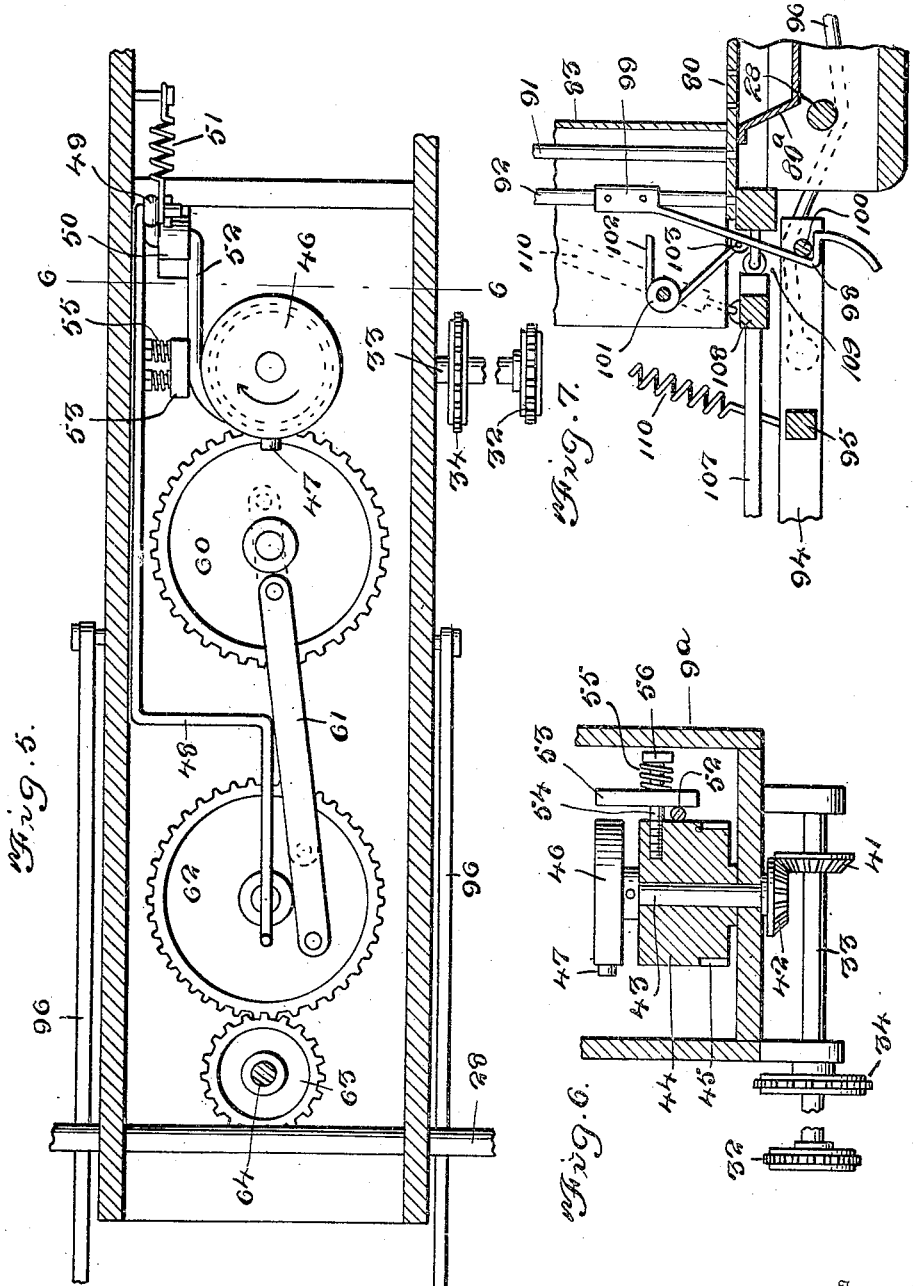

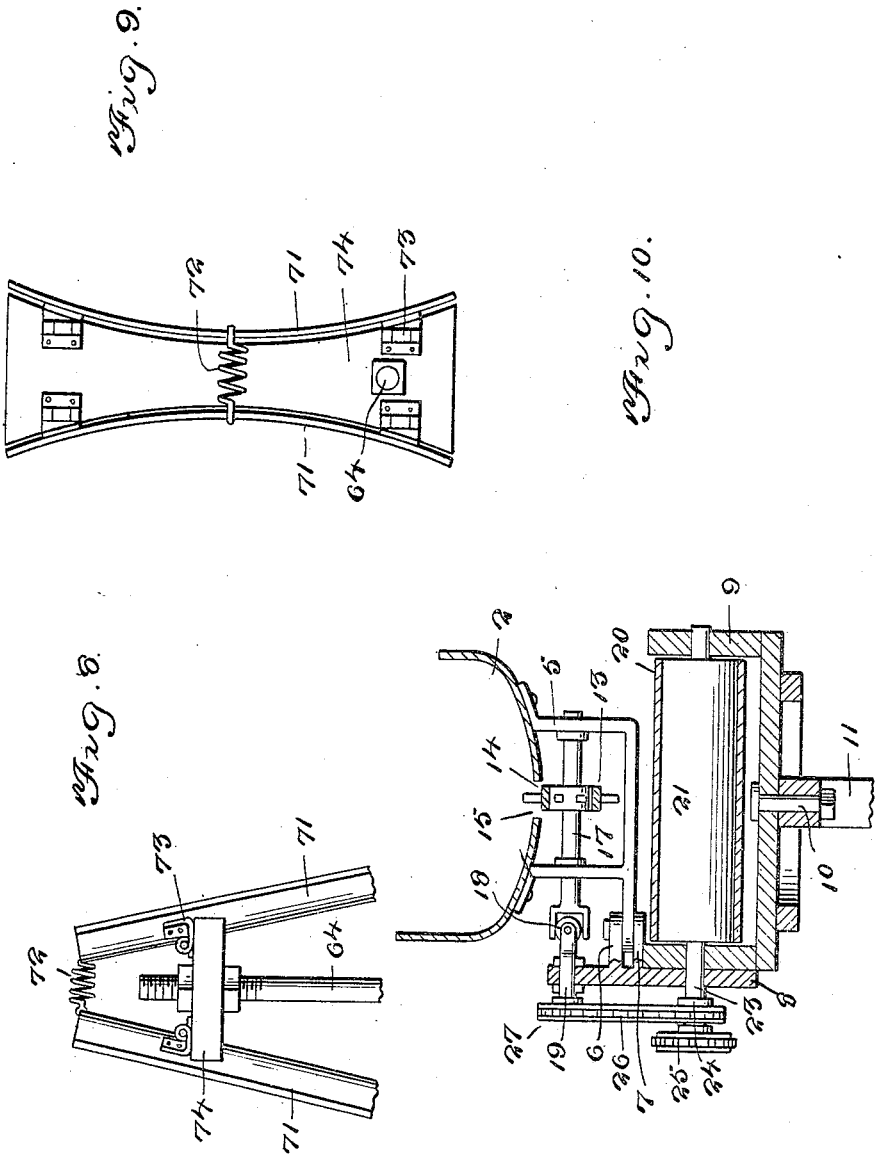

UNITED STATES PATENT OFFICE.

JOHN H. KEOWN, OF ORD, NEBRASKA.

SHOCKER ATTACHMENT FOR HARVESTER-BINDERS.

1,371,902.    Specification of Letters Patent.    Patented Mar. 15, 1921.

Application filed January 30, 1920. Serial No. 355,293.

*To all whom it may concern:*

Be it known that I, JOHN H. KEOWN, a citizen of the United States, residing at Ord, in the county of Valley and State of Nebraska, have invented new and useful Improvements in Shocker Attachments for Harvester-Binders, of which the following is a specification.

The object of my present invention is the provision of an organized mechanism in the form of an attachment for a harvester binder and embodying such a construction and relative arrangement of parts that it is adapted to receive bundles of grains, one by one, from the harvester binder, assemble the said bundles into a shock and deposit the shock with bundles in upright position on the ground, all in one continuing operation, and with but little manual attention, and in such manner that subsequent to the deposit of a shock on the ground the parts will re-assume their normal positions ready for the assembly of a plurality of bundles into another shock.

To the attainment of the foregoing, the invention consists in the improvement as hereinafter described and definitely claimed.

In the accompanying drawings, hereby made a part hereof:

Figure 1 is a side elevation illustrating my novel shocker attachment with the forward portion thereof broken away.

Fig. 2 is a complete plan view showing the relation of the attachment to the bundle discharge of a harvester-binder.

Fig. 3 is a longitudinal vertical section of the attachment.

Fig. 4 is a view similar to Fig. 3, but with certain parts in different positions.

Fig. 5 is an enlarged detail view in plan, of the gearing that is controlled by the oscillating bundle follower, and serves to actuate said follower.

Fig. 6 is a cross-section on the line 6—6 of Fig. 5.

Fig. 7 is an enlarged detail section showing the bundle supporter, the auxiliary bundle-supporting shelf and certain appurtenances thereof.

Fig. 8 is a detail side elevation of the oscillatory bundle follower.

Fig. 9 is a plan view of the same.

Fig. 10 is a detail transverse section taken in the plane indicated by the line 10—10 of Fig. 2.

Similar numerals of reference designate corresponding parts in all of the views of the drawings.

At 1, Fig. 2, is the bundle discharge of a harvester-binder, from which discharge the bundles pass sidewise.

Arranged alongside the said discharge 1 is a trough 2, Figs. 2 and 10; said trough having a contracted rear portion 3. The trough 2 is connected at 4 to the harvester binder, and this is the sole connection of the trough to the harvester binder. At its under side the trough 2 is provided with a bracket frame 5 that is fixed to the trough, Fig. 10, and the said bracket frame 5 is hingedly connected at 6 to the lateral arms 7 on an upright 8 that is fixed to and rises from the forward end of a trough-like frame 9. The said forward end of the trough-like frame 9 is superimposed on and connected by a king-bolt 10 with a truck 11 supported by a ground wheel 12. Movable in the longitudinal center of the bottom portion of the trough 2 is the upper stretch of a longitudinal conveyer 13, which is passed around a sprocket wheel 14, Fig. 10, and derives its motion therefrom. Said sprocket wheel 14 works in a slot 15 in the bottom of the trough 2 and is fixed on a transverse shaft 17, one end of which is connected through a swivel joint 18 with a shaft 19 journaled in the upright 8 on the frame 9. The pivotal connection 6 and the swivel connection 18 are provided in order to enable the frame 9 to swing laterally independently of the trough 2 and its bracket frame 5, as when a turn is being made. Movable longitudinally in the frame 9 is an apron 20 to which the bundles are fed, one by one, by the conveyer 13. The said apron 20 is passed around rollers 21 and 22, and it will be observed by reference to Fig. 10 that the shaft 23 of the roller 21 is provided with sprocket gears 24 and 25. The sprocket gear 24 is connected through a sprocket belt 26 with a sprocket gear 27 on the shaft 19, and hence it will be understood that motion is transmitted from the shaft 23 to the shaft 17 for the driving of the conveyer 13. The rear portion of the frame 9 is supported by an axle shaft 28, fixed on which are ground wheels 29, and also fixed on said shaft 28 is a sprocket gear 30, Fig. 2, that is connected by a sprocket belt 31 with a sprocket gear 32 on a transverse shaft 33 carried by the frame 9. Also fixed on the shaft 33 is a sprocket gear 34 that is connected by a sprocket belt 35, Fig. 1, with a sprocket gear 36 on a transverse shaft 37, said shaft 37 also having fixed thereto a sprocket gear 38. This sprocket gear 38 engages the upper stretch of a belt 39, the rear portion of which is passed around an idler sprocket wheel 40, and the forward portion of which is passed around the sprocket wheel 25 on the shaft 23. By virtue of the driving connection described, it will be noted that the conveyer 13 is driven from the sprocket gear 30 that derives its motion from one of the ground or tractor wheels 29. In addition to the sprocket gears 32 and 34, the transverse shaft 33 is provided as shown in Figs. 3, 4, and 6, with a beveled gear 41. The said gear 41, as best shown in Fig. 6, is intermeshed with a beveled gear 42 on an upright shaft 43 in a pendent portion 9ª of the frame 9. Loose on the shaft 43, and supported by the said frame portion 9ª, is a gear 44 having spur gear teeth 45. Fixed on the shaft 43 and arranged above the gear 44, is a revoluble disk 46 on the periphery of which is a radial tappet 47. At 48, Figs. 3, 4 and 5, is a trigger, designed to be moved longitudinally rearward by means hereinafter described. At its forward end, the said trigger 48, which is in the form of a bent rod, is connected to the upstanding arm 49 of a lever that is fulcrumed in the frame portion 9ª at the point 50, in Fig. 3. A retractile spring 51 serves to return the trigger rod 48 and the arm 49 to and yieldingly hold the same in the positions shown in Figs. 3 and 5. In addition to the arm 49, the lever alluded to has a rearwardly reaching arm 52, the rear portion of which is curved, and is designed to rest between the smooth portion of the periphery of the gear 46 and a finger 53, Figs. 5 and 6. The said finger 53 is movable laterally on rods 54 that extend horizontally from the gear 44, and outward movement of the said finger 53 is yieldingly resisted by springs 55, mounted on the rods 54 and interposed between heads 56 thereon and the outer side of the finger 53. It will here be noted that when the lever arm 52 is in the position shown in Figs. 5 and 6, the tappet 47 on the disk 46 will clear and pass the finger 53, and consequently no rotation of the gear 44 will attend the rotation of the constantly driven shaft 43. When, however, the trigger rod 48 is moved longitudinally rearward, the arm 52 of the lever described will be swung downwardly from between the periphery of the gear 44 and the finger 53, whereupon the springs 55 will press the finger 53 inwardly, so that said finger 53 will be engaged by the tappet 47, with the result that the gear 44 will be turned by and with the disk 46 through one complete revolution. At the completion of the said revolution of the gear 44, the arm 52 will have re-assumed its normal position, and consequently as the gear 44 completes its revolution in the direction indicated by arrow in Fig. 5, the curved and beveled end portion of the arm 52 will enter between the periphery of the gear 44 and the finger 53, and by so doing will press the finger 53 against the action of the springs 55 in the direction away from the periphery of the gear 44, so that the tappet 47 will be released by finger 53 and on its subsequent passage, the tappet 47 will clear and will not engage the finger 53. Intermeshed with the spur gear teeth 45 of the gear 44, is a spur gear 60, and connected through a pitman 61 with the spur gear 60 is another spur gear 62, all as best shown in Fig. 5. The spur gear 62 is intermeshed with a spur gear 63 fixed on an upright shaft 64, and when the spur gear 60 is rotated in the manner described it will be noted that the spur gear 62 will be oscillated; also that the gear 63 will be oscillated and the shaft 64 will be rocked about its axis first in one direction and then in the other. This rocking of the shaft 64 is to oscillate the bundle-follower which will now be described in detail; the said bundle-follower being arranged as shown in Figs. 2, 3 and 4, relatively to the apron 20. In this connection it will be noted, first that a hood 70 is arranged over the rear portion of the apron 20; also, that normally one of the blades 71 of the oscillatory bundle-follower is inclined from the vertical rearwardly from the rear portion of the apron 20, Figs. 1, 3 and 4. The said blades 71 are concavo-convex in horizontal section, Figs. 2 and 9, and their upper ends are connected through the medium of a retractile spring 72. At about the proportional distance illustrated below their upper ends, the blades 71 are hingedly connected, each at two points 73, to a head 74 that is fixed, preferably in an adjustable manner, on the upright shaft 64. The bundles are carried grain-heads foremost rearwardly on the upper stretch of the apron 20, and when the end of each bundle engages the blade 71 that is at that time opposed to the rear portion of the apron 20, the bundle will operate to press the lower portion of the said blade 71 rearwardly, and the said blade 71, by pressing the trigger rod 48 rearwardly, will bring about the movement of the bundle-follower about the axis of the shaft 64. For instance, with the parts arranged as shown in Fig. 2, the pressure of the rearmost bundle on the apron 20 will move the presented blade 71 and thereby move the trigger rod 48 rearwardly. This will put the bundle-follower in operation and it will tend to press the bundle which is then in upright position as hereinafter explained, on a platform 80 in the direction of the arrow shown on the platform 80 in Fig. 2. The described movement of the bundle-follower about its axis will present the other blade 71 of the follower to the forward portion of the apron 20, and when the last mentioned blade 71 is encountered by the next succeeding bundle, and is moved rearwardly by the same, together with the trigger rod 48, the bundle-follower will be swung in the direction opposite to that indicated by arrow, and the last-named bundle will be moved before the follower in the same direction. In this manner one bundle is moved toward the left on the platform 80, and the following bundle is moved toward the right on said platform 80 and so on. It will also be noticed that when the rearmost portion of each bundle encounters the blade 71 that is presented to the rear portion of the apron 20, the bundle will be guided by the presented blade 71 into an upright position on the platform 80—i. e., in such position that the grain heads are uppermost.

Fixed to and rising from the platform 80 at opposite sides thereof are fenders 81 of curvilinear form.

In addition to the head 74, the shaft 64 of the oscillatory bundle-follower is provided with a lower portion 82 that is designed to serve as a stop for the lower portion of each blade 71 when said portion is moved by a bundle to move the trigger rod 48 rearwardly.

Disposed in the longitudinal center of the attachment and on the rear portion of platform 80 is an upright deflector 83, of V-form in horizontal section, which has for its function to guide some of the bundles toward the right and the alternate bundles toward the left, the bundles at that time of course being in upright position.

Fixed to and rising from opposite sides of the rear portion of the platform 80 are uprights 84, the upper ends of which are connected by a crown-bar 85, Figs. 1, 2 and 3. The said crown-bar 85, in turn, is connected by a longitudinal central curvilinear bar 86 with the crown-bar 87 of the sub-frame at the rear end of the frame 9.

Hingedly connected at 88, Fig. 2, to the uprights 84 are presser arms 89 that are movable in a horizontal plane, and are backed by spring strips 90. The said spring-backed presser arms 89 are designed to exert inward pressure against the bundles, so as to retain the bundles in a compact group or shock.

Fixed to and rising from the rear portion of the longitudinal center of the platform 80 are upright rods 91 and 92 which are also fixed at their upper ends to the curvilinear bar 86, Figs. 2 and 3. Guided by and movable vertically on the said rods 91 and 92 is a longitudinal central vertically disposed partition 93 against which the bundles are yieldingly pressed and held by the presser arms 89.

Movable downwardly from and upwardly to the position shown in Figs. 1 and 3, is the shock supporter 94 of the attachment. The said shock supporter is preferably composed of a plurality of laterally spaced tines, Fig. 2. The said tines are fixedly connected together through the medium of a forward cross-bar 95. Pivotally connected to the supporter 94 and the frame 9 are vertically swinging rods 96, Figs. 1, 2, 3 and 4. These rods 96 strongly connect the supporter 94 with the frame 9, and yet do not interfere with the movement of the supporter 94 from the position shown in Fig. 3 to that shown in Fig. 4, and vice versa.

Interposed between the forward portion of the supporter 94 and the uprights 84 are retractile springs 97, Figs. 1, 2 and 4, the function of which is to raise the supporter 94 from the bundle-delivering position shown in Fig. 4 to the bundle-receiving position shown in Figs. 1 and 3. Manifestly when a full complement of bundles to form a shock, say ten bundles, are arranged on the supporter 94, five bundles at one side of the partition 93 and five bundles at the opposite side of said partition, the supporter when manually released, as hereinafter described, will gravitate from the position shown in Fig. 3 to that shown in Fig. 4. Then as the attachment is drawn forwardly, the said collected complement of bundles will be left in shock form on the ground, whereupon the springs 97 will raise the supporter 94 to the position shown in Figs. 1, 3 and 7, in which position the supporter will be detachably secured through the medium of the latch 98 that is connected at 99 to the upright rod 92. The rod 100, Figs. 3, 4 and 7, at the forward end of the supporter 94 rides into engagement with the latch 98 incidental to the described upward movement of the supporter 94.

Mounted between the portions of the deflector 83 is a sheave 101, and over the said sheave is carried the cable 102, through the medium of which an attendant on the harvester-binder disengages the latch 98 from the rod 100, when it is desired to release and permit of downward movement of the supporter 94 with a lot of bundles thereon; the said cable 102 being connected at 103 to the latch 98. On the completion of their upward movement, the rods 96 bring up against axle 28 in the rear portion of the frame 9, and by virtue of this, Fig. 7, the supporter 94 will be strongly, though detachably, secured in its raised position.

The partition 93 and the supporter 94 are connected together through the medium of a cable 105, Fig. 3, that is passed over a sheave 106 on the bar 86. Consequently downward movement of the supporter 94 will be attended by upward movement of the partition 93, and when the supporter 94 is raised to its bundle-receiving position, the partition 93 will gravitate to its working position, shown in Fig. 3. In the said working position, the partition 93 will separate the two longitudinal series of bundles, and when the partition 93 is raised, the presser arms 89 will be enabled to press the upper portions of the two series of bundles farther inwardly so as to contribute to the formation of a proper shock.

In order to support one bundle fed rearwardly from the platform 80 while the supporter 94 is away from the position shown in Figs. 1 and 3, I provide the auxiliary supporter or shelf 107. This auxiliary supporter or shelf 107 includes a transverse head 108 and two pairs of tines that extend rearwardly from said head, and the said auxiliary supporter 107 is hingedly connected at its forward end, as indicated by 109, to the rear portion of the platform 80, and is yieldingly maintained in the horizontal position shown in Fig. 1 by retractile springs 110, the upper ends of which are connected to the uprights 84. It is to be understood in this connection that incidental to the downward movement of the supporter 94 and the upward movement of the partition 93, the auxiliary supporter 107 will swing downwardly so as to permit the two bundles that are then upon the auxiliary supporter 107 to slip off the same and be deposited with the other bundles on the ground. The springs 110, however, are strong enough to prevent downward movement of the auxiliary supporter 107 when there is only one bundle on the auxiliary supporter 107 at the time before the supporter 94 is restored to its raised position.

It will be apparent from the foregoing that my novel attachment requires no attention on the part of an operator or operators other than the manipulation of the latch 98 when a shock is to be delivered to the ground.

I prefer to have the platform 80 foraminous, in order to allow loose grain to drop through the same into a receptacle 80ª, Fig. 3. This receptacle may be arranged to deliver at any desired point.

Having described my invention, what I claim and desire to secure by Letters-Patent, is:

1. In a shocker, the combination of a frame, a platform carried thereby, an upright, oscillatory bundle-follower above the platform, said follower comprising an upright rock-shaft, a head thereon concavo-convex blades hinged at intermediate points in their lengths to the head, and a retractile spring interposed between and connecting the upper ends of the blades, means to turn said follower first in one direction and then in the other, said means being constructed and arranged to be put into operation by movement of one of the blades by a bundle, and means to put said follower-actuating means out of operation.

2. In a shocker, the combination of a wheel-supported frame, a platform carried thereby, an upright, oscillatory bundle-follower above the platform, means to deliver bundles one by one to the platform and against the follower, means to turn the bundle-follower first in one direction and then in the other, said means being put into operation by movement of the follower by a bundle, means to put the follower-actuating means out of operation, a vertically movable shock supporter connected with the frame and arranged to receive bundles fed rearwardly on the platform, means to raise the said supporter after the delivery of a shock to the ground, manually releasable means to engage the shock supporter when the same is so raised, and an auxiliary spring sustained shock supporter hinged to the rear portion of the platform.

3. In a shocker, the combination of a wheel-supported frame, a platform carried thereby, an upright, oscillatory bundle-follower above the platform, means to deliver bundles one by one to the platform and against the follower, means to turn the bundle-follower first in one direction and then in the other, said means being put into operation by movement of the follower by a bundle, means to put the follower-actuating means out of operation, a vertically movable shock supporter connected with the frame and arranged to receive bundles fed rearwardly on the platform, means to raise the said supporter after the delivery of a shock to the ground, manually releasable means to engage the shock supporter when the same is so raised, an auxiliary spring-backed shock supporter hinged to the rear portion of the platform, a deflector above the rear portion of the platform, a vertically movable longitudinal partition in rear of said deflector, a sheave, a cable passed over said sheave and connecting the shock supporter and said partition, and spring-backed presser arms arranged at opposite sides of and spaced from the vertical plane of the partition.

4. In a shocker, the combination of a wheel-supported frame, a platform carried thereby, a deflector above the platform, means to feed bundles rearwardly at opposite sides of the deflector, a vertically movable shock supporter, vertically swinging rods connecting said supporters with the frame, retractile springs interposed between the supporter and the frame and adapted to raise the supporter when the same is relieved of weight, a manually-controlled latch to retain the supporter in its raised position, a vertically movable longitudinal central partition, a sheave, a cable passed over said sheave and connecting the supporter and said partition, and spring-backed presser arms disposed at opposite sides of the plane of the partition, and a vertically swinging auxiliary supporter hingedly connected to the platform and yieldingly supported.

5. In a shocker, the combination of a wheel-supported frame, a platform, a vertically movable spring-sustained shock supporter connected with the frame, an auxiliary supporter hingedly connected with the frame and yieldingly supported, and means to detachably secure the shock supporter in raised position.

In testimony whereof I affix my signature.

JOHN H. KEOWN.